No. 637,457. Patented Nov. 21, 1899.
E. T. GREENFIELD.
ELECTRICAL HOUSE WIRING.
(Application filed Mar. 29, 1899.)
(No Model.)
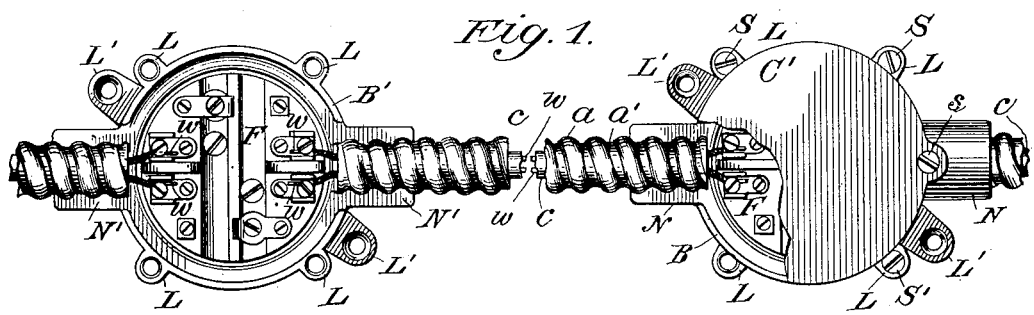
Fig. 1.
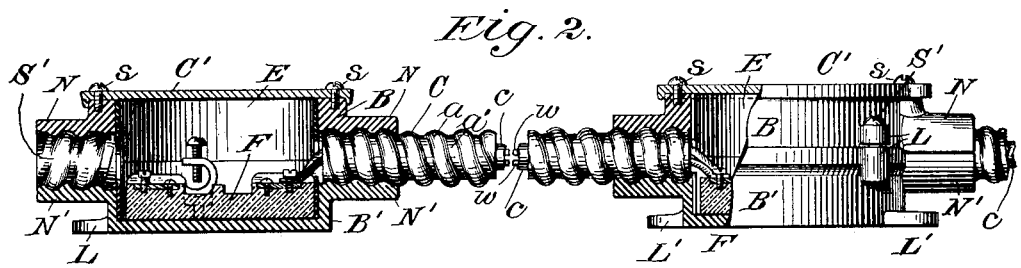
Fig. 2.
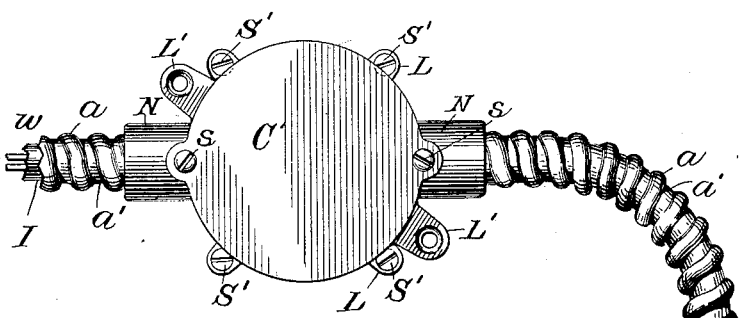
Fig. 3.
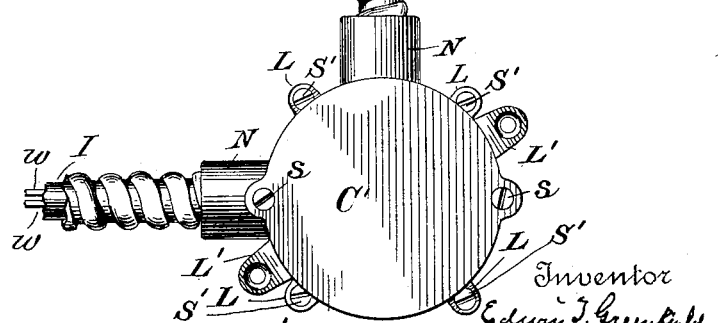
Witnesses
Edward A. Rooks
M. F. Keating
Inventor
Edwin T. Greenfield
By his Attorney
Charles J. Kintner

UNITED STATES PATENT OFFICE.

EDWIN T. GREENFIELD, OF NEW YORK, N. Y.

ELECTRICAL HOUSE-WIRING.

SPECIFICATION forming part of Letters Patent No. 637,457, dated November 21, 1899.

Application filed March 29, 1899. Serial No. 710,919. (No model.)

*To all whom it may concern:*

Be it known that I, EDWIN T. GREENFIELD, a citizen of the United States, residing at New York, in the borough of Manhattan, county and State of New York, have made a new and useful invention in Electrical House-Wiring, of which the following is a specification.

My invention is directed especially to novel features in connection with the running of electrical conductors through buildings and wherever systems of electrical illumination and power transmission are utilized; and its objects are, first, to provide a system of house-wiring in which the electrical conductors are protected by a metallic armor which is self-compensating for heat and cold, and therefore capable of being rigidly secured to the walls or ceilings of a building or beneath the floors thereof in such manner that the permanent fastenings therefor will not be disturbed or moved by variations in temperature after the conductors have been put in place; second, to connect such armored system of conductors with junction-boxes of such a structure that the entire system may be placed in a building and all of the conductors and their connections made easily accessible for the purpose of connecting them to electrical translating devices, such as electric lamps, electric motors, and kindred apparatus; third, to construct a system of armored house-wiring and the connecting junction-boxes therefor in such manner that the entire system will be of a flexible nature, so that the armored or protected conductors may be conveyed around corners and at various angles, as the necessities of the case may require.

My invention will be fully understood by referring to the accompanying drawings, in which—

Figure 1 is a plan view of two of my novel junction-boxes interconnected by a flexible armored conduit, the top of one of the junction-boxes being removed for the purpose of showing the interior connections of the conductors and a portion of the other of said junction-boxes being broken away for the same purpose. Fig. 2 is a part sectional and part side elevational view of the parts illustrated in Fig. 1, one of the junction-boxes being broken away for the purpose of showing the interior structure thereof. Fig. 3 is a plan view embodying two junction-boxes connected together with my novel form of flexible armored cable, this figure illustrating the flexible nature of the system by reason of the possibility of curving the cable.

In a prior application filed by me in the United States Patent Office on the 12th day of December, 1898, bearing Serial No. 698,973, I have described and claimed a novel form of electrical conduit composed of flexible metallic strips wound spirally together, with vent-openings between their engaging edges, the same being of such a nature that it constitutes a flexible metallic armor for one or more inclosed insulated conducting-wires, and in a prior patent granted to me on the 27th day of December, 1898, No. 616,612, I have described and claimed an armored electric cable having an armor composed of interlocking spirally-wound strips. My present invention contemplates in house-wiring the use of such flexible armored conduits and flexible armored cables in connection with means of support rigidly secured to the walls or ceilings or other points of support where conductors are usually conveyed in the wiring of buildings and similar structures. A flexible conduit composed of interlocking armor-strips and a flexible cable provided with such an interlocking armor is necessarily self-compensating for variations in temperature by reason of the spiral relations of the armor, so that when the same is secured at various points to rigid points of support there will be no danger of the supporting means being disturbed by variations in temperature, and in this feature lies one of the essential elements of my present invention.

Referring now to the drawings in detail and first to Figs. 1 and 2, C represents a flexible metallic conduit composed of two interlocking spirally-wound strips of metal $a$ and $a'$, the same being not substantially different from the invention disclosed in my prior application above referred to. B B' represent a metallic junction-box made in two halves and secured together by screws S' S' in lugs or ears L L in the separate halves of said junction-box. E represents an insulating-lining of well-known form for the box, and F a non-conducting fuse-block, such as is well known in the art. C' represents the lid or cover of the junction-box secured to the upper half thereof by screws s s. L' L' represent lugs or ears to the lower half B' of the junction-box for securing it to the wall, ceiling, or beneath the floor of a building or other point of support. N N' represent the half portions of interiorly-screw-threaded necks integral with the parts B and B', respectively, the pitch of said screw-threads when the parts are put together in the manner illustrated in Fig. 2 being such that said necks will receive and firmly secure the corresponding spiral or screw-threaded ends of the conduit C and securely hold the same in place. c represents an insulated cable containing any number of electrical conductors w w—two being shown—the ends of said conductors being secured in the usual manner to circuit-connectors in the upper surface of the fuse-block F. It will be appreciated, therefore, that in the wiring of a building with my novel self-compensating system the junction-boxes B B' B B' are secured at desired points to the surface of the wall, ceiling, or beneath the floors by screws in the lugs or ears L' L' or in any preferred manner and the self-compensating armored conduit C, cut in sections of the proper length, to be secured in the screw-threaded half-necks N N' between the halves B B' of the junction-boxes.

In Fig. 3 I have illustrated the flexible nature of my novel invention by showing how a flexible armored cable, consisting of two electrical conductors w w and insulation I, with armor-strips a and a', may be connected to fixed junction-boxes, like those already described in connection with Fig. 2, it being apparent that the flexible and self-compensating nature of the armored cable will enable the builder or contractor to put the system in any place where well-known forms of rigid conduits and non-compensating conduits cannot be successfully utilized.

I do not limit my invention to the especial details herein shown and described, as many of the features hereinbefore described, and illustrated in the accompanying drawings, may be materially departed from and still come within the scope of my claims hereinafter made. To illustrate, I believe it is broadly new with me to provide one or more electrical conductors with a surrounding or incasing metallic armor which is of a self-compensating nature and to attach the same rigidly to points of support throughout a building, whether the same be junction-boxes or other means of support, the novelty in this feature of my invention lying in the application of the broad principle of a system of armored electrical conductors which are self-compensating for variations in temperature and in such manner that such variations will not affect or disturb their rigid supports. I believe it is also broadly new with me to incase or surround a flexible cable or wire with spirally-wound armor-strips and to sustain or support the same at various points by two-part junction-boxes adapted to be clamped together and by their clamping action about or around said spirally-wound strips firmly hold or secure the armored conductor or conductors inclosed therein. The adjoining spirals of my novel form of armor constitute also, in effect, projections or protuberances on the surface of the cable or conduit about which they are wound, and the threads in the half-necks of the junction-boxes constitute recesses with which said projections or protuberances engage, and I therefore desire to claim, broadly, a structure in which the parts are secured together by projections or protuberances on one part engaging with corresponding recesses in the other part.

Having thus described my invention, what I claim, and desire to secure by Letters Patent of the United States, is—

1. In a system of electrical house-wiring one or more electrical conductors surrounded by a metallic armor, in combination with rigid means of support permanently secured to a wall, ceiling or other surface, said metallic armor being self-compensating for variations in heat and cold, substantially as described.

2. In a system of electrical house-wiring one or more electrical conductors surrounded by a metallic armor attached at its opposite ends to electrical junction-boxes rigidly and permanently secured to points of support, as a wall or ceiling, said metallic armor being self-compensating for variations in heat and cold, substantially as described.

3. In a system of electrical house-wiring one or more electrical conductors surrounded by a flexible metallic armor attached at its opposite ends to permanent means of support rigidly secured to a wall, ceiling or other surface, said flexible metallic armor being self-compensating for variations in heat and cold, substantially as described.

4. In a system of electrical house-wiring one or more electrical conductors surrounded by a flexible metallic armor attached at its opposite ends to electrical junction-boxes provided with means for adapting them to be rigidly secured to points of support, as a wall or ceiling, substantially as described.

5. A junction-box composed of two halves having each one or more integral half-necks screw-threaded interiorly and adapted, when put together, to constitute each a continuous screw-threaded support for an inleading armored conduit or cable, one half of said junction-box being provided with means for securing it to a wall, ceiling or other surface, substantially as described.

6. A junction-box composed of two halves having each one or more integral half-necks screw-threaded on its inner side, in combination with means for securing the halves of the junction-box together, one half of said junction-box being provided with means for securing it to a wall, ceiling or other surface, substantially as described.

7. A junction-box composed of two halves having each one or more half-necks screw-threaded interiorly, in combination with means for securing the halves of the junction-box together and a removable lid for covering the entire box, the arrangement being such that when the two halves of the box are put together the two half-necks constitute a screw-threaded support for an inleading armored conduit or cable, substantially as described.

8. A junction-box composed of two halves provided each with an interiorly-screw-threaded half-neck and an insulating-lining, together with a fuse-block secured in the base of the lower half, a removable lid for the box, and means for securing the two halves of the box together, in such manner that the two half-necks, when put together, constitute a single screw-threaded neck, substantially as described.

9. A junction-box composed of two halves having each a single screw-threaded half-neck and means for securing the lower half of the box to a fixed point of support, together with a removable lid for the box and means for securing the two halves thereof together, substantially as described.

10. In a system of electrical house-wiring one or more electrical conductors surrounded by a flexible metallic armor, in combination with two junction-boxes composed each of two halves provided with half-necks and means for securing the ends of the flexible armored conduit or cable thereto, said junction-boxes being provided with means for securing them rigidly to a wall, ceiling or similar surface, substantially as described.

11. In a system of electrical house-wiring one or more electrical conductors surrounded by a spirally-wound flexible metallic armor, in combination with two junction-boxes composed each of two halves provided with half-necks screw-threaded interiorly with threads having the same pitch as the spiral of the armor, together with means for securing said half junction-boxes together and additional means for securing them to a wall, ceiling or similar surface, substantially as described.

12. The combination of a flexible metallic armor or casing of spirally-wound strips for electric cables or wires with a junction-box composed of two parts adapted to be clamped together around the same, and in such manner that the clamping action of the two-part junction-box securely holds or sustains the armored cable or wire, substantially as described.

13. The combination with a spirally-wound flexible metallic casing for electric cables or wires, said casing having exterior protuberances on its surface, of a junction-box or other connecting-socket, comprising two parts adapted to be clamped together, and having means therefor, said parts having their clamping-surfaces formed with recesses to engage said protuberances.

In testimony whereof I have hereunto subscribed my name this 27th day of March, 1899.

EDWIN T. GREENFIELD.

Witnesses:
C. J. KINTNER,
M. F. KEATING.